US008136353B2

(12) United States Patent
Dybing

(10) Patent No.: US 8,136,353 B2
(45) Date of Patent: Mar. 20, 2012

(54) METHOD AND APPARATUS FOR AUTOMATIC PUMP SHUTOFF

(75) Inventor: Philip James Dybing, Canton, MN (US)

(73) Assignee: Eaton Corporation, Cleveland, OH (US)

( * ) Notice: Subject to any disclaimer, the term of this patent is extended or adjusted under 35 U.S.C. 154(b) by 701 days.

(21) Appl. No.: 12/267,898

(22) Filed: Nov. 10, 2008

(65) Prior Publication Data

US 2010/0115937 A1 May 13, 2010

(51) Int. Cl.
*F16D 31/02* (2006.01)

(52) U.S. Cl. ............................... 60/327; 60/328; 60/459

(58) Field of Classification Search .................... 60/327, 60/328, 403, 452, 459, 465
See application file for complete search history.

(56) References Cited

U.S. PATENT DOCUMENTS 5,493,861 A * 2/1996 Friedrichsen .................. 60/328
2008/0110509 A1* 5/2008 Hancock ......................... 91/436

* cited by examiner

*Primary Examiner* — Michael Leslie
(74) *Attorney, Agent, or Firm* — Quinn Law Group, PLLC

(57) ABSTRACT

A method of detecting a fluid leak in a hydraulic fluid circuit includes preventing fluid from entering the circuit when an actual outlet flow rate from a pump is positive while a requested outlet flow rate to a hydraulic machine is zero. An outlet port of a variable displacement port can be selectively blocked, while in a fixed displacement pump (FDP) fluid can be diverted from the outlet port to a secondary fluid circuit. The actual outlet flow rate can be measured using a flow sensor or a swash plate angle depending on the pump design. A hydraulic fluid circuit includes a hydraulic machine, a pump, a valve at an outlet port of the pump, and a controller. The controller determines the requested flow rate, and actuates the valve to prevent fluid from entering the circuit whenever the actual outlet flow rate is positive during zero requested flow rate.

17 Claims, 1 Drawing Sheet

METHOD AND APPARATUS FOR AUTOMATIC PUMP SHUTOFF

TECHNICAL FIELD

The present invention relates generally to the control of a hydraulic fluid circuit, and in particular to a method and apparatus for detecting a potential fluid leak to minimize the effects thereof.

BACKGROUND OF THE INVENTION

A hydraulic fluid circuit is energized via a hydraulic pump, a device which can be configured in a variety of ways depending on the particular application. However configured, a hydraulic pump can be designed to deliver either a fixed or a variable amount of fluid displacement. As evident by the name, a fixed displacement pump can displace a fixed or a calibrated volume of fluid with each revolution of the pumping elements housed therein, e.g., rotary vanes, lobes, screws, gears, etc. Likewise, a variable displacement pump can displace a variable or an adjustable volume of fluid to more closely match the changing or fluctuating fluid demand in the hydraulic fluid circuit, with such demand determined using load-sensing devices and methodologies of the type known in the art.

Regardless of the particular configuration of the pump, hydraulic pumps are well suited to providing a reliable supply of fluid pressure to the various devices or machines within the hydraulic fluid circuit. Substantial fluid pressure can be supplied to such hydraulically-actuated machinery as presses, ejectors, lifts, etc., thus energizing these machines to perform useful work. Localized control and machine functionality in turn can be optimized using electro-hydraulic directional valves, regulators, and/or other necessary fluid control devices. However, despite the substantial utility of fluid power when properly used within a manufacturing environment, the effectiveness of a fluid-powered machine depends on the physical integrity of the various hose, piping, fittings, connectors, and other conduit portions joining the principal components of the hydraulic circuit in which the machine resides. Any of these conduit portions have the potential to leak due to damage or age, thus potentially starving the hydraulic machinery of the necessary fluid power and causing a fluid spill in the manufacturing area.

SUMMARY OF THE INVENTION

Accordingly, a method and an apparatus are provided for minimizing the duration of, and thus the impact or effect of, a fluid leak within a hydraulic fluid circuit. Using the method of the invention, a control system or apparatus continuously or intermittently monitors fluid demand within the fluid circuit and automatically senses conditions indicative of a fluid leak. In response to the detected fault conditions, any new outlet flow from a pump can be selectively prevented from entering the hydraulic fluid circuit until appropriate corrective action can be taken. In this manner, the existence of a fluid leak can be quickly verified and corrected while limiting the duration of a fluid leak. By limiting the duration of the spill from the fluid leak, the severity of the leak is minimized, along with the corresponding down time required for recovering from such a leak.

In particular, a method of detecting a fluid leak in a hydraulic fluid circuit having a hydraulic pump includes determining a requested outlet flow rate requested by one or more hydraulic machines, determining an actual outlet flow rate of fluid from the pump, and selectively preventing the fluid from entering the hydraulic fluid circuit when the actual outlet flow rate from the pump is positive while the requested outlet flow rate is effectively zero, i.e., is at a level that is less than a minimum threshold.

According to one embodiment, the pump can be configured as a variable displacement pump (VDP), and the fluid can be prevented from entering the circuit by blocking an outlet port of the VDP using a control valve or other device. In another embodiment, the pump can be configured as a fixed displacement pump (FDP), with the fluid prevented from entering the circuit via redirection or diversion of the flow back to a reservoir or tank through a secondary hydraulic circuit.

Determining an actual outlet flow rate can include measuring a variable angle of an adjustable swash plate of the pump when the pump is configured as a VDP, and then calculating the actual outlet flow using the variable angle. In another embodiment, the actual outlet flow rate can be measured using a flow meter or flow sensor, regardless of whether the pump is configured as a VDP or an FDP. The hydraulic fluid circuit can also include a normally-closed (NC) solenoid valve positioned at the outlet port of the pump, or in close proximity thereto, with automatic blocking or redirecting/diversion of the fluid enabled by selectively de-energizing the NC solenoid valve so that it defaults to a predetermined position.

The method can also include determining a variance between the actual outlet flow rate and the requested outlet flow rate, and then executing a suitable control action when this variance is greater than a permissible or calibrated threshold variance or range. The control action can be any appropriate action, including selectively blocking the outlet of a VDP, diverting the fluid from an FDP, and/or activating an audio-visual indicator. The latter method step may be useful in circumstances in which a hydraulic machine requests some positive level of flow at a level less than the actual outlet flow from the pump, conditions potentially indicative of a fluid leak.

Also within the scope of the invention, a hydraulic fluid circuit includes a hydraulic machine having a requested flow rate, a hydraulic pump having an outlet port, an outlet valve positioned at or in close proximity to the outlet port, and a controller. The controller has an algorithm configured for determining an actual outlet flow rate of fluid from the pump, with the controller also operable for determining the requested flow rate from the hydraulic machine or machines. The controller selectively actuates the outlet valve to thereby direct the flow from the outlet port whenever the actual outlet flow rate is positive while the requested flow rate is zero. As noted above, direction of flow can be tailored to the configuration of the pump to include blocking the outlet port of a variable displacement pump (VDP) or redirecting or diverting the fluid discharged from a fixed displacement pump (FDP) through a secondary hydraulic circuit to a reservoir or tank, in either case preventing the flow of fluid to the hydraulic circuit.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
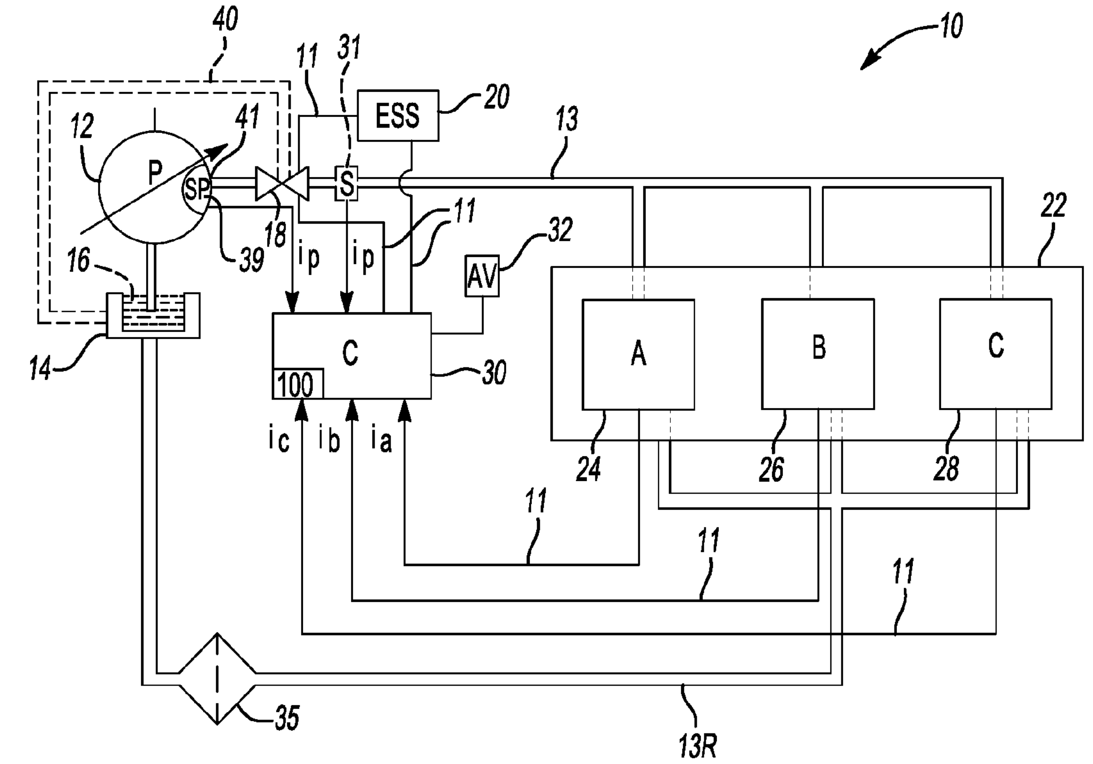
FIG. 1 is a schematic illustration of a hydraulic circuit in accordance with the invention.

Referring to the drawings wherein like reference numbers represent like components throughout the several figures, and beginning with FIG. 1, a hydraulic fluid circuit 10 includes various hydraulic components each interconnected via a supply line 13. The various hydraulic components include a hydraulic pump (P) 12, a fluid control valve 18, and one or more hydraulic machines 22. The supply line 13 includes any required lengths of pipe, tubing, hose, fittings, connectors, and/or other required conduit portions necessary for transporting or directing hydraulic fluid 16 from the pump 12 to the machines 22. A return line 13R constructed of similar conduit portions can transport or circulate the fluid 16 back to the pump 22. Additional hydraulic components can include a fluid filter 35, which is shown in FIG. 1 as being positioned within the return line 13R, but which may also be positioned at any suitable location in the supply line 13 to protect the various hydraulic components from particulate and/or other suspended contaminants.

The machines 22 can include one or more hydraulically-actuated devices or machines 24, 26, and/or 28, also respectively labeled A, B, and C in FIG. 1. As will be understood by those of ordinary skill in the art, each of the machines 24, 26, and 28 can be configured as a hydraulic press, fork, lift, arm, stamping machine, cutting device, etc., or any other hydraulically-actuated machine or device operable for producing useful work within a manufacturing environment. The hydraulic circuit 10 includes an electronic control unit or controller (C) 30 having a control algorithm 100 as described below with reference to FIG. 2. Each of the machines 22 is electrically connected to or in communication with the controller 30 via a control path 11, which can be a wireless pathway or a hardwired or encoded electrical connection. Each machine 24, 26, 28 can communicate or transmit a requested flow rate (arrows $i_a$, $i_b$, $i_c$, respectively) to the controller 30 via the control path 11, with the requested flow rates from the machines 22 used by the algorithm 100 of FIG. 2 as set forth below.

The controller 30 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the controller 30 or accessible thereby, including the algorithm 100 of FIG. 2, can be programmed or stored in ROM and executed by the controller 30 to provide the respective functions of each resident algorithm.

Still referring to FIG. 1, within the scope of the invention the pump 12 can be configured as a variable displacement pump (VDP) or a fixed displacement pump (FDP), either of which can utilize state-of-the-art load sensing devices and methodologies. However configured, the pump 12 is in fluid communication with a reservoir, tank, or sump 14 containing hydraulic fluid 16. The fluid 16 is drawn into the pump 12 and pressurized thereby via a set of pumping elements (not shown), such as reciprocating pistons when the pump 12 is a VDP, or rollers, vanes, screws, etc., when the pump 12 is configured as an FDP, as discussed previously hereinabove. The fluid 16 is discharged from the pump 12 through an outlet port 41, and into the fluid circuit 10 through the supply line 13.

The valve 18 is positioned at or in close proximity to the outlet port 41 of the pump 12, and is in electrical communication with each of the controller 30 and an energy storage system (ESS) 20, such as a battery, capacitance module, or other suitable electrical or electro-chemical energy storage device. The controller 30 is operable for selectively actuating the valve 18 as needed to direct the fluid 16 being discharged from the pump 12 into the supply line 13 as explained below. The valve 18 can be configured as a normally-closed (NC) solenoid-operated valve of the type known in the art, with the valve configured to default to a closed position in the event power feed from the ESS 20 to the valve 18 is interrupted. When the pump 12 is configured as a VDP, the valve 18 can be a blocking valve adapted to block the fluid 16 from entering the supply line 13. When the pump 12 is configured as an FDP, the valve 18 can be configured as a directional control valve.

When the pump 12 is configured as an axial piston pump according to one embodiment, a plurality of reciprocating pistons (not shown) can be arrayed in a circular configuration within a rotatable portion or cylinder block. In such a configuration, an adjustable swash plate (SP) 39 can be used to regulate the outlet flow of fluid 16 from the pump 12. As will be understood by those of ordinary skill in the art, the adjustable swash plate 39 can be held stationary relative to the rotating cylinder block via a set of springs (not shown) or other suitable biasing device, and oriented a predetermined angle with respect to the axis of the rotating cylinder block.

When the pump 12 is configured as an FDP, this swash plate angle is fixed or constant to provide the required calibrated outlet flow. In a VDP, the swash plate angle is variable, and can be adjusted as needed to provide the required outlet flow based on demand, with the swash plate angle being generally proportional to the required outlet flow. That is, an increase in the swash plate angle relative to the axis of the rotating cylinder block can afford a greater range of motion to the reciprocating pistons within the cylinder block, with a resultant increase in outlet flow from the pump 12.

Figure 2:
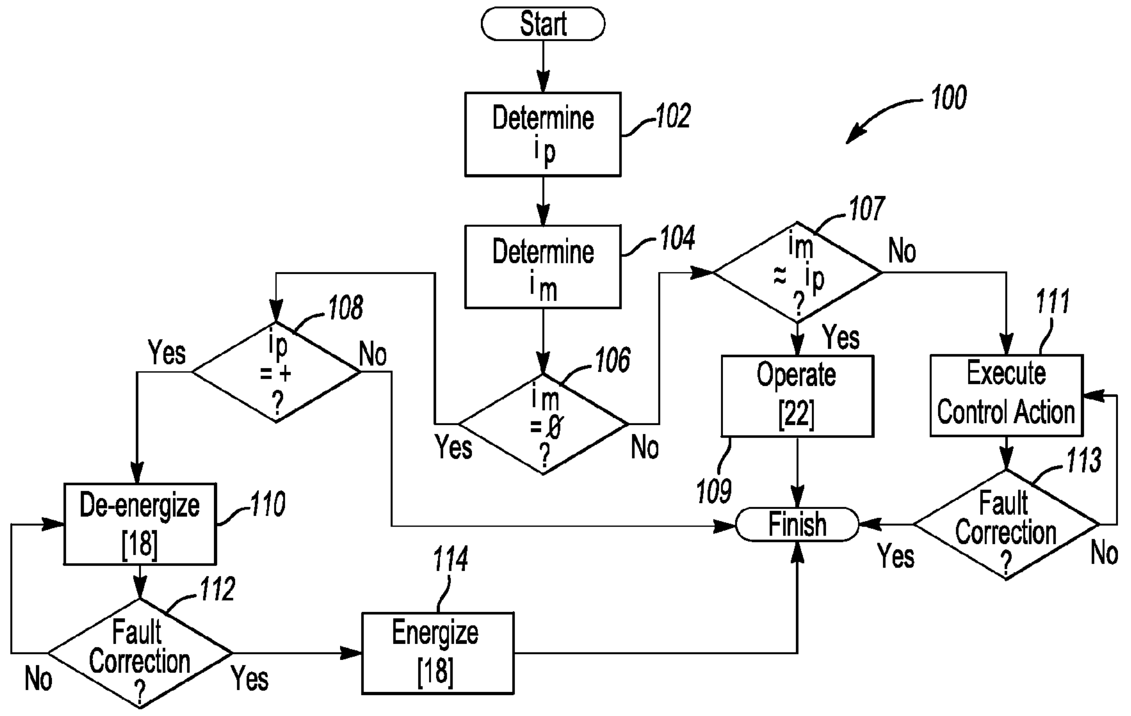
FIG. 2 is a flow chart describing a method for controlling the hydraulic circuit of FIG. 1.

Referring to FIG. 2, and with reference to the fluid circuit 10 of FIG. 1 as set forth above, the algorithm 100 of the controller 30 can be executed by the controller 30 to provide a method of detecting a fluid leak in the fluid circuit 10. In general, the method enabled by the algorithm 100 determines a requested outlet flow rate as requested or commanded by any or all of the machines 22. The actual outlet flow rate of the fluid from the pump 12 is determined via sensing, measurement, calculation, or other suitable means, and the fluid 16 discharged from the pump 12 is directed in a particular manner when the actual outlet flow rate is positive while the requested outlet flow rate is zero. When there is some level of demand from the machines 22, the actual outlet flow from the pump 12 is compared to this demand, and a control action is taken when the actual outlet flow exceeds the demand, i.e., the requested outlet flow, by a predetermined or calibrated threshold.

In particular, the algorithm 100 begins at step 102 and measures, senses, detects, calculates, or otherwise determines a flow signal (arrow $i_p$) corresponding to an actual flow rate of the pump 12. When the pump 12 is configured as a VDP, the flow signal (arrow $i_p$) can be a measured position of the adjustable swash plate 39 within the pump 12. When the pump 12 is configured as either an FDP or a VDP, the flow signal (arrow $i_p$) can be measured or sensed using a flow sensor (S) 31 adapted to measure, sense, or otherwise determine the actual flow rate of the fluid 16 at or in close proximity to the outlet port 41 of the pump 12.

When the pump 12 is configured as an FDP in particular, and particularly when used in conjunction with state-of-the-art load-sensing fluid control methodologies often used with pumps of the VDP type, the valve 18 can be configured as a load-sensing flow control valve of the type known in the art. In this respect, the valve 18 is controlled via the load-sensing signal, i.e., the requested flows represented collectively by arrows $i_a$, $i_b$, and $i_c$. This device can be formed integrally with or separately from a flow regulator, which can be selectively controlled as needed via the controller 20 to fully bypass the hydraulic circuit 10, and with the bypass triggering the cut off or blockage of flow of the fluid 15 to the valve 18.

The flow sensor 31 can include, by way of example, one or more mass, volume, and/or a velocity flow sensory devices or meters, any of which can utilize magnetic flow sensing technology, paddle wheel or turbine flow sensing technology, and/or ultrasonic flow sensing technology, or any other suitable flow sensing technologies. Once the value of the flow signal (arrow $i_p$) has been determined, the algorithm 100 proceeds to step 104.

At step 104, the demand or requested flow rate (arrow $i_m$) representing the amount of fluid 16 required by any or all of the machines 22 is determined, such as by sensing or detecting an automatically-generated and/or an operator-generated input flow command at any of the machines 22. The requested flow rate ($i_m$) is defined herein as the sum of the flow signals (arrows $i_a$, $i_b$, and $i_c$) for the machines 24, 26, and 28, respectively. Again, while only three exemplary machines are shown in FIG. 1 for simplicity, more or fewer machines can be provided within the fluid circuit 10 that may require fluid 16 from the pump 12 without departing from the intended scope of the invention, with the demand from such machines being included in the total of the requested output flow. Once the requested outlet flow (arrow $i_m$) has been determined, the algorithm 100 proceeds to step 106.

At step 106, the requested flow rate (arrow $i_m$) is compared to a predetermined minimal threshold, which can be zero or a permissible minimal positive value approximating zero, in order to determine the presence of a zero demand condition. If the requested outlet flow (arrow $i_m$) is substantially equal to zero, the algorithm 100 proceeds to step 108, otherwise proceeding to step 107.

At step 107, the requested flow rate (arrow $i_m$) is compared to the actual outlet flow (arrow $i_p$) determined at step 102. If the values are approximately the same, i.e., if the actual outlet flow (arrow $i_p$) is equal to the requested flow rate (arrow $i_m$) within an allowable tolerance or threshold margin, the algorithm proceeds to step 109. Otherwise, the algorithm 100 proceeds to step 111.

At step 108, the actual outlet flow (arrow $i_p$) determined at step 102 is evaluated by the controller 30 to determine if the actual outlet flow (arrow $i_p$) is positive. If so, the algorithm 100 proceeds to step 1 10. Otherwise, the algorithm 100 is finished.

At step 109, the machines 22 are operated in the usual manner. That is, having determined at step 106 that a requested outlet flow (arrow $i_m$) exists that is substantially equal to the actual outlet flow (arrow $i_p$), i.e., within an allowable margin thereof, the algorithm 100 determines that a fluid leak in the fluid circuit 10 is unlikely to exist, and proceeds to operate the machines 22 in the usual manner.

At step 110, having determined at step 108 that the actual outlet flow (arrow $i_p$) is positive while at the same time determining at step 106 that the requested outlet flow is effectively zero, the algorithm 100 immediately de-energizes the valve 18 to direct the fluid 16 as needed depending on the configuration of the pump 12. As noted above, when the pump 12 is a VDP, step 110 can be executed to prevent the fluid 16 from entering the hydraulic fluid circuit 10 by blocking flow of the fluid 16 into the supply line 13. When the pump is an FDP, step 100 can be executed to direct or divert the fluid 16 into the secondary fluid circuit 40 back to the sump 14, thus ensuring that the outlet port 41 of the pump 12 is not blocked when the pump 12 is an FDP, a flow condition which could potentially damage the pump 12. The algorithm 100 then proceeds to step 1 12.

At step 111, the algorithm 100 executes a predetermined control action. The control action can be any action appropriate under the circumstances, such as actuating the valve 18 as described above to thereby direct the fluid 16 as needed, i.e., by blocking or diverting the fluid 16 depending on the configuration or design of the pump 12. Alternately or concurrently, the control action can include activating an optional audio and/or visual device (AV) 32 to alert an operator to the potential of a fluid leak in the fluid circuit 10.

Step 111 can also be tailored to the particular variance between the actual flow rate (arrow $i_p$) and the requested flow rate (arrow $i_m$). When the variance is within an allowable tolerance during operation of one of the machines 22, an appropriate control action might entail alerting an operator to a potential leak without automatically directing fluid 16 away from the fluid circuit 10. If such a leak is affirmatively detected or confirmed by an operator or other means, an operator can elect to signal the valve 18 to actuate. When the leak is determined to be minor, or when the importance of correcting the leak does not outweigh the continued operation of the machines 22, the audio/visual device 32 can at least alert the operator to the presence of the fluid leak, with an appropriate corrective action occurring after the fluid leak has been repaired. The algorithm 100 then proceeds to step 113.

At step 112, the algorithm 100 determines whether the fault or fluid leak has been corrected or repaired, repeating steps 110 and 112 in a loop until the fault has been corrected. Once corrected, the algorithm 100 proceeds to step 114.

At step 113, the algorithm 100 determines whether the fault has been corrected, i.e., whether the fluid leak has been repaired, or if not repaired, whether some other control action, such as activating the audio/visual device 32, has been executed. If so, the algorithm 100 is finished. Otherwise, the algorithm 100 repeats step 111 as described above until step 113 determines that the fault has been corrected.

At step 114, having determined at step 112 that the fault or leak has been corrected, the algorithm 100 proceeds to step 114, wherein the valve 18 is again energized. Completion of step 114 will open the valve 18 if used with a pump 12 configured as a VDP, thus unblocking the flow of fluid 16 from the outlet port 41. Likewise, when the pump 12 is configured as an FDP, the completion of step 114 will transition the valve 18 to discontinue circulation of the fluid 16 into the secondary fluid circuit 40, allowing the fluid 16 to enter the fluid circuit 10. Once flow to the fluid circuit 10 has resumed, the algorithm 100 is complete.

While the best modes for carrying out the invention have been described in detail, those familiar with the art to which this invention relates will recognize various alternative designs and embodiments for practicing the invention within the scope of the appended claims.

The invention claimed is:

1. A method of detecting a fluid leak in a hydraulic fluid circuit having a hydraulic machine and a pump operable for supplying fluid to the hydraulic machine for energizing the hydraulic machine, the method comprising:

determining a requested outlet flow rate of the fluid that is requested by the hydraulic machine;

determining an actual outlet flow rate of the fluid from the pump; and automatically preventing the fluid from entering the hydraulic fluid circuit when said actual outlet flow rate is positive while said requested outlet flow rate is zero.

2. The method of claim 1, wherein the pump is configured as a variable displacement pump (VDP), and wherein automatically preventing the fluid from entering the hydraulic fluid circuit includes selectively blocking an outlet port of the VDP.

3. The method of claim 1, wherein the pump is configured as a fixed displacement pump (FDP), and wherein automatically preventing the fluid from entering the hydraulic fluid circuit includes selectively diverting the fluid away from the hydraulic fluid circuit.

4. The method of claim 1, wherein determining a requested outlet flow rate includes detecting one of an automatically-generated input flow command and an operator-generated input flow command.

5. The method of claim 1, wherein said determining an actual outlet flow rate includes measuring said actual outlet flow rate using a flow sensor.

6. The method of claim 1, wherein the pump is configured as a variable displacement pump (VDP) having an adjustable swash plate with a variable swash plate angle, and wherein determining an actual outlet flow rate includes calculating said actual outlet flow using said variable swash plate angle.

7. The method of claim 1, wherein the hydraulic fluid circuit includes a normally-closed (NC) solenoid valve positioned at an outlet port of the pump, said NC solenoid valve being adapted to selectively prevent the fluid from entering the hydraulic fluid circuit when said NC solenoid valve is de-energized, and wherein automatically preventing the fluid from entering the hydraulic fluid circuit includes selectively de-energizing said NC solenoid valve.

8. The method of claim 1, further comprising:

determining a variance between said actual outlet flow rate and said requested outlet flow rate; and executing a control action when said variance is greater than a calibrated threshold variance.

9. The method of claim 8, wherein said control action is selected from the group consisting essentially of: selectively blocking an outlet port of the pump and activating an audio-visual device.

10. A method of detecting a fluid leak in a hydraulic circuit having a hydraulic machine and a variable displacement pump (VDP) with an adjustable swash plate, the method comprising:

determining a requested outlet flow rate required for energizing the hydraulic machine;

measuring a position of the adjustable swash plate;

determining an actual outlet flow rate from the VDP using the measured position of the adjustable swash plate;

comparing said actual outlet flow rate to said requested outlet flow rate; and selectively blocking an outlet port of the VDP when said actual outlet flow rate is positive while said requested outlet flow rate is zero.

11. The method of claim 10, wherein the hydraulic circuit includes a normally-closed (NC) solenoid valve positioned at said outlet port of the VDP and configured for selectively blocking said outlet port, and wherein blocking an outlet port of the VDP includes selectively de-energizing said NC solenoid-valve.

12. The method of claim 10, wherein determining an actual outlet flow rate includes selecting said actual outlet flow rate from a calibrated table indexed at least in part by said position.

13. The method of claim 10, further comprising:

determining a variance between said actual outlet flow rate and said requested outlet flow rate; and selectively blocking the outlet port only when said actual outlet flow rate is positive, said requested outlet flow rate is zero, and said variance is greater than a calibrated threshold variance.

14. A hydraulic fluid circuit comprising:

a hydraulic machine operable for generating a requested flow rate;

a pump having an outlet port, said pump being operable for providing an outlet flow of fluid to said hydraulic machine for energizing said hydraulic machine;

a valve positioned at an outlet port of said pump; and a controller configured for determining an actual outlet flow rate of said fluid from said pump;

wherein said controller is operable for determining said requested flow rate, and for selectively actuating said valve to thereby prevent said fluid from entering the hydraulic fluid circuit whenever said actual outlet flow rate is positive while said requested flow rate is zero.

15. The hydraulic circuit of claim 14, further comprising an energy storage system operatively connected to said valve, wherein said valve is configured as a normally-closed (NC) solenoid valve which said controller is adapted to selectively de-energize to thereby prevent said fluid from entering the hydraulic fluid circuit.

16. The hydraulic circuit of claim 14, wherein the pump is configured as a variable displacement pump (VDP) having an adjustable swash plate with a variable swash plate angle, said adjustable swash plate being positioned within said VDP and operable for varying said outlet flow;

wherein said controller is operable for calculating said actual outlet flow rate as a function of said variable swash plate angle.

17. The hydraulic circuit of claim 14, including a flow sensor in fluid communication with said outlet port and adapted to transmit a flow signal to said controller;

wherein said controller is adapted to determine said actual outlet flow rate using said flow signal.

* * * * *